United States Patent
Chakravarthula et al.

(10) Patent No.: US 8,417,759 B2
(45) Date of Patent: Apr. 9, 2013

(54) EFFICIENT IMPLEMENTATIONS OF KERNEL COMPUTATIONS

(75) Inventors: Hari Chakravarthula, San Jose, CA (US); Christopher Loo, San Jose, CA (US); Jose Mendez, San Jose, CA (US)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 1540 days.

(21) Appl. No.: 11/939,456

(22) Filed: Nov. 13, 2007

(65) Prior Publication Data

US 2008/0250094 A1 Oct. 9, 2008

Related U.S. Application Data

(60) Provisional application No. 60/922,679, filed on Apr. 9, 2007, provisional application No. 60/968,491, filed on Aug. 28, 2007.

(51) Int. Cl.
*G06F 17/16* (2006.01)

(52) U.S. Cl. ........................................................ 708/607

(58) Field of Classification Search ........................ None
See application file for complete search history.

(56) References Cited

U.S. PATENT DOCUMENTS

| | | | |
|---|---|---|---|
| 6,570,616 B1 | 5/2003 | Chen | |
| 6,928,196 B1 | 8/2005 | Bradley et al. | |
| 7,826,676 B2 * | 11/2010 | Porikli | 382/260 |
| 2005/0025379 A1 | 2/2005 | Keshet | |
| 2005/0114418 A1 | 5/2005 | Rosenstengel | |
| 2006/0093234 A1 | 5/2006 | Silverstein | |
| 2008/0219580 A1 * | 9/2008 | Porikli | 382/260 |
| 2008/0250094 A1 * | 10/2008 | Chakravarthula et al. | 708/520 |
| 2009/0077359 A1 | 3/2009 | Chakravarthula et al. | |

FOREIGN PATENT DOCUMENTS

EP 1 968 009 A2 9/2008

OTHER PUBLICATIONS

"Invitation to Pay Additional Fees and, Where Applicable, Protest Fee" received in International application No. PCT/EP2008/003278 dated Apr. 15, 2009 (6 pages).
Current Claims of International application No. PCT/EP2008/003278 (Apr. 2009) 7 pages.
Communication from European application No. 08735375.1 dated Apr. 28, 2010 (6 pages).
Current claims from European application No. 08735375.1 dated Apr. 2010 (3 pages).

(Continued)

*Primary Examiner* — David H Malzahn
(74) *Attorney, Agent, or Firm* — Hickman Palermo Truong Becker Bingham Wong LLP (57) ABSTRACT

A method and apparatus for efficiently performing digital signal processing is provided. In one embodiment, kernel matrix computations are simplified by grouping similar kernel coefficients together. Each coefficient group contains only coefficients having the same value. At least one of the coefficient groups has at least two coefficients. Techniques are disclosed herein to efficiently apply successive first order difference operations to a data signal. The techniques allow for a low gate count. In particular, the techniques allow for a reduction of the number of multipliers without increasing clock frequency, in an embodiment. The techniques update pixels of a data signal at a rate of two clock cycles per each pixel, in an embodiment. The techniques allow hardware that is used to process a first pixel to be re-used to start the processing of a second pixel while the first pixel is still being processed.

28 Claims, 9 Drawing Sheets

OTHER PUBLICATIONS

European Patent Office, "Invitation to Pay Additional Fees" received in International application No. PCT/US2008/059685 dated May 18, 2011, 8 pages, Applicant: Tessera, Inc.

Current Claims in International application No. PCT/US2008/059685, dated May 2011, 8 pages, Applicant: Tessera, Inc.

Castro-Pareja, C. et al., "FPGA-based real-time Anisotropic Diffusion Filtering of 3D Ultrasound Images" 2005 *SPIE*, 10 pages.

Kim, J., "Efficient 2-D Convolution Algorithm with the Single-Data Multiple Kernel Approach" *Academic Press, Inc.* 1995, 8 pages.

Kwang, H. et al., "Design of Multidimensional Spherically Symmetric and Constant Group Delay Recursive Digital Filters with Sum of Powers-of-Two Coefficients" 1990 *IEEE*, XP-002635471, 10 pages.

Lee Y.H. et al., "GA-based Design of Multiplierless 2-D State-Space Digital Filters With Low Roundoff Noise" *IEEE Proc.-Circuits Devices System* Apr. 1998, 8 pages.

Porikli, F., "Reshuffling: A Fast Algorithm for Filtering with Arbitrary Kernels" *SPIE* 2008, XP-002524200, 10 pages.

"Notification of Transmittal of the International Search Report and the Written Opinion of the International Searching Authority, or the Declaration" received in International application No. PCT/EP2008/003278 dated Jul. 22, 2009 (15 pages).

Current Claims of PCT/EP2008/003278 dated Jul. 2009 (7 pages).

U.S. Appl. No. 11/945,743, filed Nov. 27, 2007, Final Office Action Sep. 17, 2012

* cited by examiner

EFFICIENT IMPLEMENTATIONS OF KERNEL COMPUTATIONS

RELATED APPLICATIONS

This application claims benefit of Provisional Appln. 60/922,679, filed Apr. 9, 2007, the entire contents of which is hereby incorporated by reference as if fully set forth herein, under 35 U.S.C. §119(e).

This application claims benefit of Provisional Appln. 60/968,491, filed Aug. 28, 2007, the entire contents of which is hereby incorporated by reference as if fully set forth herein, under 35 U.S.C. §119(e).

FIELD OF THE INVENTION

The present invention relates to digital signal processing. In particular, embodiments of the present invention relate to techniques for minimizing gate-level resources that are required to perform various signal processing applications that involve applying a kernel matrix.

BACKGROUND

Figure 1:
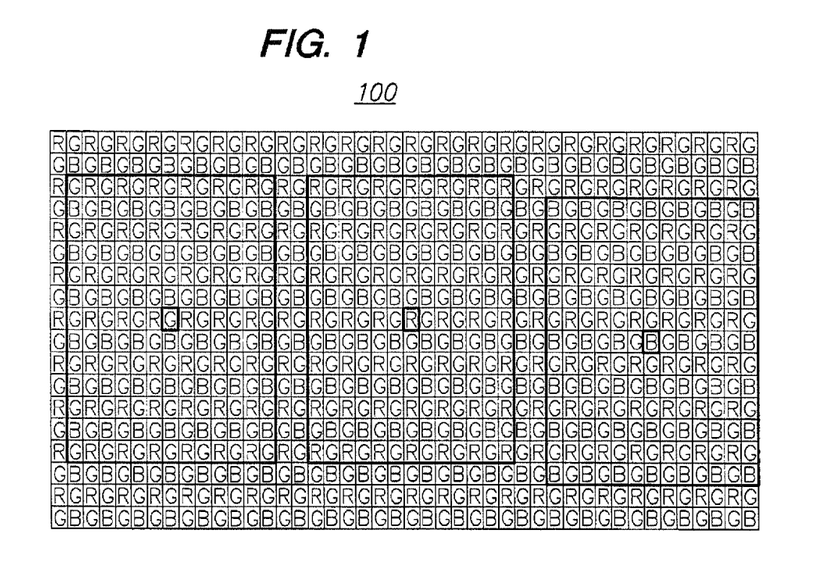
FIG. 1 is an illustration of a pixel grid of a typical CMOS image sensor.

FIG. 1 depicts a portion of a pixel grid 100 of a typical CCD or CMOS image sensor. The pixel grid 100 is in raw Bayer format in which each pixel is represented by a discrete color and in which rows contain either red and green pixels or blue and green pixels. Several 13×13 kernel areas are depicted overlaying the pixel grid 100. Kernels (sometimes referred to as masks, templates, or windows) are often used in image processing to perform neighborhood operations. In one example, each kernel operation updates the value of the center pixel of the respective kernel area. Therefore, the kernel that is used for each area is based on the color of the center pixel. The entire CMOS image sensor could contain up to a million or even millions of pixels.

Figure 2:
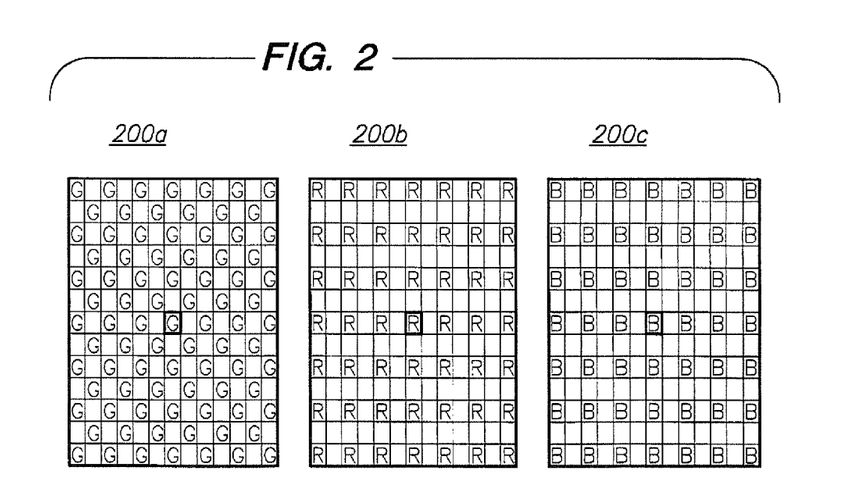
FIG. 2 depicts three color kernels that may be used to process and update pixels of the pixel grid of FIG. 1.

FIG. 2 depicts coefficient locations for exemplary green 200a, red 200b and blue 200c kernel matrices. The coefficients are depicted as a letter (R/G/B) rather than the actual value for the coefficient. The red 200b and blue 200c kernel matrices each have a 7×7 pattern. However, the green kernel matrix 200a has the 7×7 pattern overlaid by a 6×6 pattern. Note that the patterns in FIG. 2 correspond to the pixel grid 100 of the image sensor FIG. 1. To apply the kernel to the image data, each kernel coefficient is multiplied by the value of the corresponding pixel in the region of the pixel grid 100 that is overlaid by the kernel ("kernel region"). Based on these multiplications, the center pixel in each kernel region is updated. For example, the multiplication products are summed together and the sum is used to replace the center pixel value.

Table I shows the number of operations that could be used to perform the kernel computations.

TABLE I

| Kernel Color | Kernel Size | # of Multipliers | # of Adders |
| --- | --- | --- | --- |
| Red | 7 × 7 | 49 | 48 |
| Blue | 7 × 7 | 49 | 48 |
| Green | 7 × 7 and 6 × 6 | 85 | 84 |
| Total | | 183 | 180 |

Table I shows that performing the kernel computations requires one multiplier and about one adder for every kernel coefficient, therefore undesirably utilizing considerable gate-level resources.

It may be possible to reduce the gate-level resources by increasing the speed of the clock used to perform the kernel computations. For example, increasing the clock speed by a factor of N could help to reduce the gate-level resources to 1/N by re-using resources during the extra clock cycles. However, realizing such high clock frequencies may be very difficult or impossible, and may also lead to other problems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Methods and devices are disclosed herein for efficiently performing digital signal processing. The techniques involve applying a kernel matrix to image data in order to achieve image contrast enhancement, in one embodiment. However, the techniques can be used for digital signal processing other than image contrast enhancement. For example, the techniques may be used to perform image filtering, noise reduction, edge enhancement, and the like.

In one embodiment, kernel matrix computations are simplified by grouping similar kernel coefficients together. In this embodiment, kernel coefficients that share a common value are grouped together such that coefficient groups are identified. Each coefficient group contains only coefficients having the same value. At least one of the coefficient groups has at least two coefficients. However, a coefficient group could have only a single coefficient. Each kernel coefficient has a corresponding entry in a data matrix to which the kernel is to be applied. For example, each entry in the data matrix could represent a pixel value, wherein the pixels collectively represent a signal. However, the matrix entries are not limited to representing pixel values. For each coefficient group, the value of each signal matrix entry that corresponds to coefficients in the coefficient group are summed. Then, the sum is multiplied by the coefficient value for the coefficient group.

In one embodiment, the kernel coefficients are symmetrically distributed in the kernel matrix. For example, the coefficients may be radially symmetric with respect to a central coefficient in the kernel matrix. However, the coefficients could posses a different symmetry, such as being symmetric about a line in the kernel matrix. Furthermore, it is not required that the coefficients are arranged with any symmetry in the kernel matrix.

In one embodiment, the kernel coefficients are a sum of a power of two, which allows a multiplier to be replaced by an adder. Thus, gate-level resources are reduced.

Techniques are disclosed herein to efficiently apply successive first order difference operations to a data signal. The techniques allow for a low gate count. In particular, the techniques allow for a reduction of the number of multipliers without increasing clock frequency, in an embodiment. The techniques update pixels of a data signal at a rate of two clock cycles per each pixel, in an embodiment. The techniques allow hardware that is used to process a first pixel to be re-used to start the processing of a second pixel while the first pixel is still being processed.

Example Kernel Matrices

Figure 3:
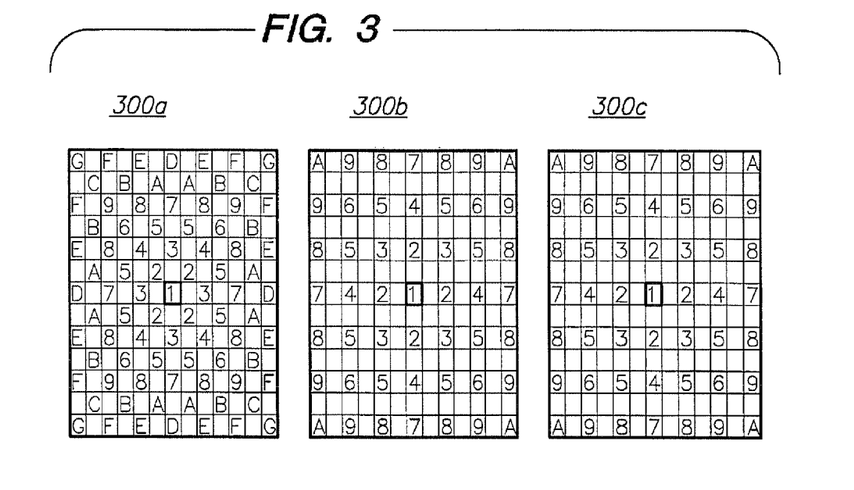
FIG. 3 are examples of radially symmetric color kernels.

FIG. 3 depicts several kernel example matrices 300a-300c, which are used when processing in accordance with embodiments of the present invention. The kernel coefficients are "radially symmetric" about the center coefficient, in this example. By radially symmetric it is meant that coefficients that are the same "distance" from the center coefficient have the same value. Measuring distance in the kernel is based on the data sensor for which the kernel applies. For example, if the data sensor is a CMOS image sensor, then the distance may be the physical distance between pixels in the sensor. Note that a kernel having radially symmetric coefficients may be especially useful for situations such as compensating for a lens point spread function (PSF), which may be radially symmetric.

To reduce the amount of gate-level resources required for kernel computations, selected pixel data is summed prior to multiplying the pixel data by kernel coefficients. For the example kernels in FIG. 3, pixel data that is equidistant from the center pixel is summed prior to multiplication by the corresponding kernel coefficient, which significantly reduces the number of multipliers required.

Table II depicts gate-level resources used for kernel computations, in accordance with an embodiment of the present invention that processes the kernels of FIG. 3.

TABLE II

| Kernel Color | Kernel Size | # of Multipliers | # of Adders |
| --- | --- | --- | --- |
| Red | 7 × 7 | 10 | 48 |
| Blue | 7 × 7 | 10 | 48 |
| Green | 7 × 7 and 6 × 6 | 16 | 84 |
| Total | | 36 | 180 |

The red and blue kernels each have 10 unique coefficient values (1–A), which in this example corresponds to the 10 unique distances coefficients are located from the center coefficient. Thus, only 10 multipliers are used when applying the red and blue kernels. The green kernel has 16 unique coefficients. Thus, only 16 multipliers are used when applying the green kernel. Thus, the number of multipliers is greatly reduced when compared to the multipliers used for the technique described in Table I. Moreover, because the gate count of an adder may be linearly proportional to the bit width, whereas the gate count of a multiplier may be proportional to the square of the bit width, the reduction in gate level resources is substantial.

Figure 4:
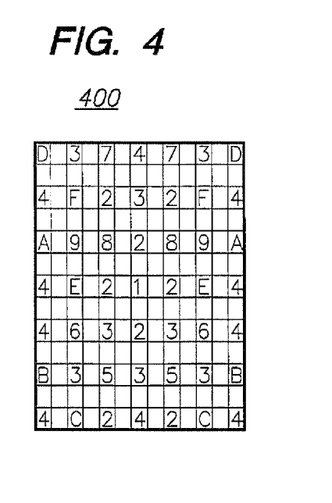
FIG. 4 depicts an example kernel matrix in which the coefficients are symmetric about the middle column of coefficients.

There is no requirement that the kernel coefficients be radially symmetric. For example, the coefficients could posses a different symmetry, such as being symmetric about a line in the kernel. The coefficients may be symmetric about horizontal, vertical, or diagonal directions. FIG. 4 depicts an example kernel matrix 400 in which the coefficients are symmetric about the middle column of coefficients. However, this symmetry line does not need to correspond to coefficient locations. For example, the symmetry line could be between two columns or rows of coefficients. Other examples of symmetry are symmetry about a horizontal line and symmetry about one or more diagonal lines.

Figure 5:
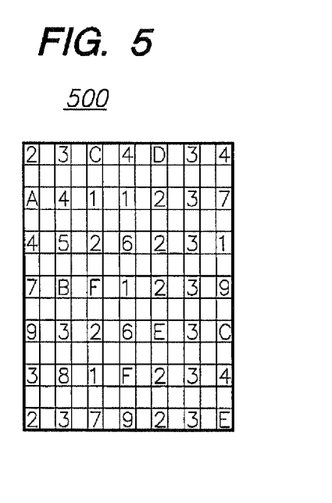
FIG. 5 depicts a kernel matrix in which kernel coefficients are distributed without any symmetry.

Furthermore, it is not required that the coefficients are arranged with any symmetry. For example, FIG. 5 depicts a kernel matrix 500 in which kernel coefficients are distributed without any symmetry. However, there are at least two kernel coefficients that have the same value as each other. Coefficients having the same value as each other are referred to herein as a "coefficient group."

General Process in Accordance with an Embodiment

Figure 6:
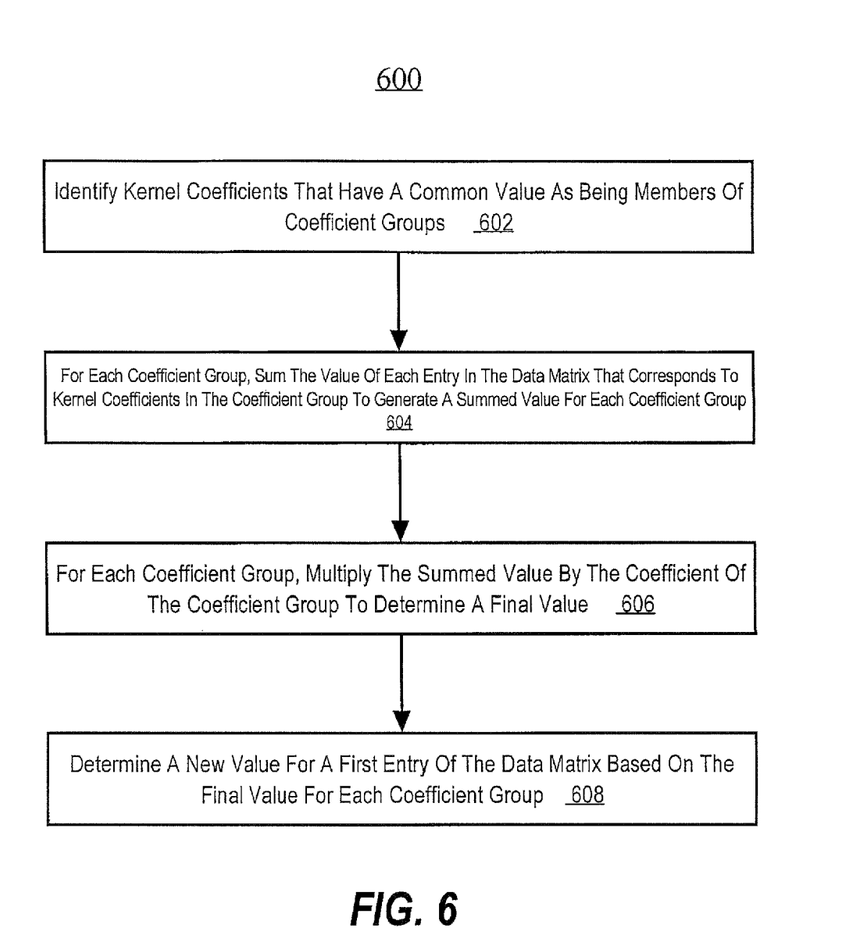
FIG. 6 is a flowchart of a process for grouping kernel coefficients to efficiently perform kernel computations, in accordance with one embodiment.

FIG. 6 is a flowchart of a process 600 for grouping kernel coefficients to efficiently perform kernel computations, in accordance with one embodiment. Process 600 will be discussed using the following example kernel computations to demonstrate how: 1) gate level resources are saved, and 2) the number of clock cycles to process a single pixel are reduced. Table III depicts example pixel data and Table IV depicts an example kernel matrix to be applied.

TABLE III

| 2 |  | 3 |  | 4 |
|---|---|---|---|---|
|   |   |   |   |   |
| 9 |  | 1 |  | 5 |
|   |   |   |   |   |
| 8 |  | 7 |  | 6 |

TABLE IV

| B |  | C |  | B |
|---|---|---|---|---|
|   |   |   |   |   |
| C |  | A |  | C |
|   |   |   |   |   |
| B |  | C |  | B |

In step 602, kernel coefficients that have a common value are identified as being members of coefficient groups. Note that while the example kernel matrix in Table IV has nine coefficients, there are only three unique coefficient values. Thus, the coefficient groups are groups A, B, and C. At least one of the coefficient groups includes at least two kernel coefficients. However, it is not required that each group has multiple coefficients. Each kernel coefficient has a corresponding entry in a data matrix of Table III.

In step 604, for each coefficient group, the values of the entries in the data matrix that correspond to kernel coefficients in the coefficient group are summed to generate a summed value for each coefficient group. In step 606, for each coefficient group, the summed value is multiplied by the coefficient of the coefficient group to determine a final value. In step 608, a new value is determined for a first entry of the data matrix based on the final value for each coefficient group.

Figure 8:
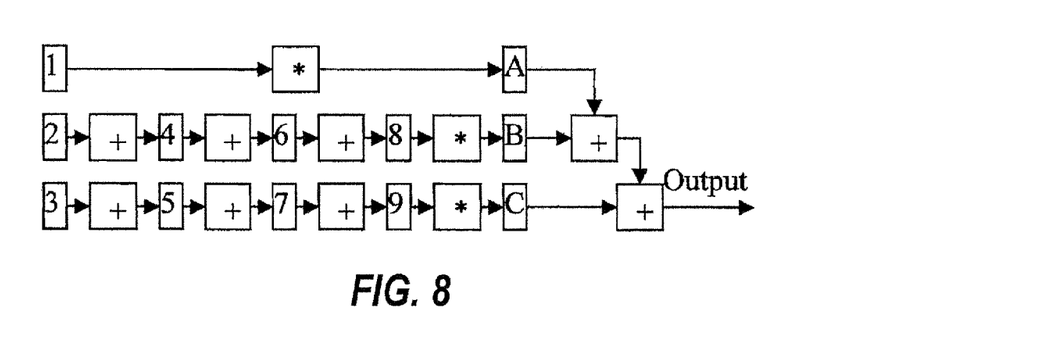
FIG. 8 depicts kernel computations in accordance with an embodiment.

FIG. 8 depicts the pixel values from TABLE III being summed prior to multiplication by the kernel coefficients, in accordance with an embodiment. Each of the multiplications and each of the additions in FIG. 8 are implemented in hardware by gate-level resources, in an embodiment. The alphanumeric characters represent inputs to the gate-level resources. Note that only three multipliers and eight adders are required. Furthermore, the gate-level resources can calculate the output in only three clock cycles, in the embodiment depicted in FIG. 8.

Figure 7:
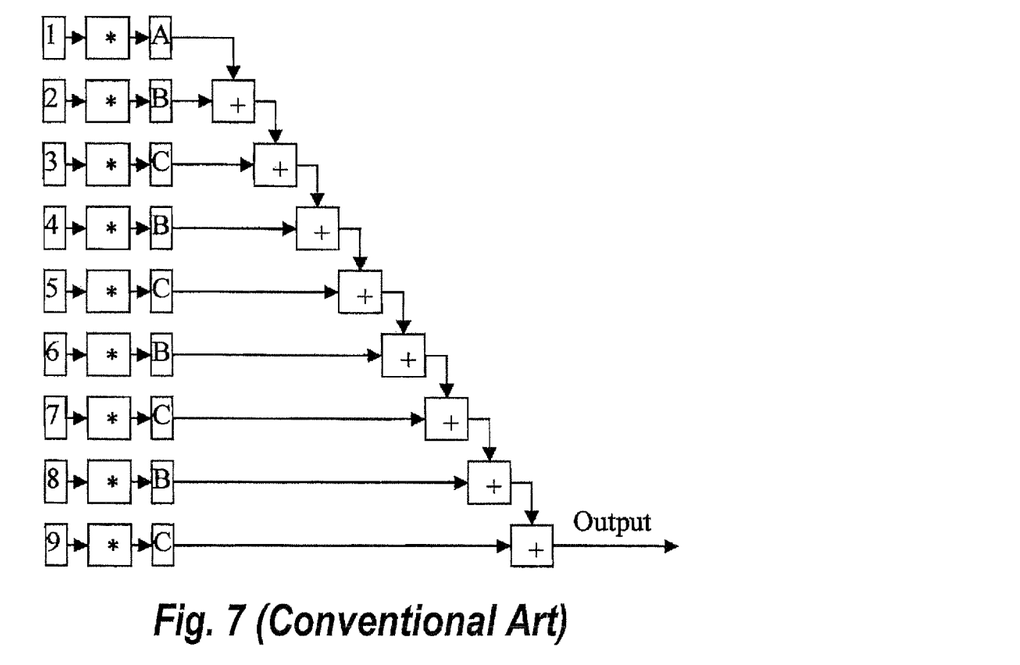
FIG. 7 shows how the kernel computation of FIG. 8 might be performed inefficiently using nine multiplications over nine clock cycles.

In contrast, FIG. 7 shows how the kernel computation might be performed inefficiently using nine multiplications over nine clock cycles.

Powers of Two Kernel Coefficients

Figure 9A:
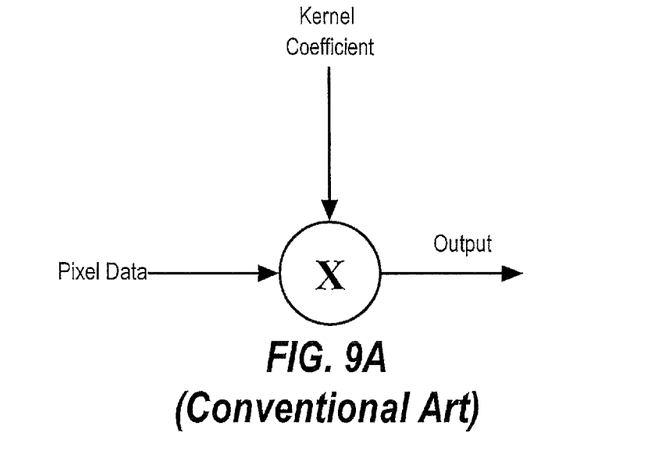
FIG. 9A depicts a conventional multiplier that is used to multiply pixel data by one kernel coefficient at a time.

In one embodiment, each kernel coefficient is represented as a sum of powers of two, which eliminates multipliers and replaces them with adders. That is, the step of multiplying by a kernel coefficient can be replaced by parallel bit shift operations followed by a single sum operation. FIG. 9A depicts a conventional multiplier that is used to multiply pixel data by one kernel coefficient at a time.

Figure 9B:
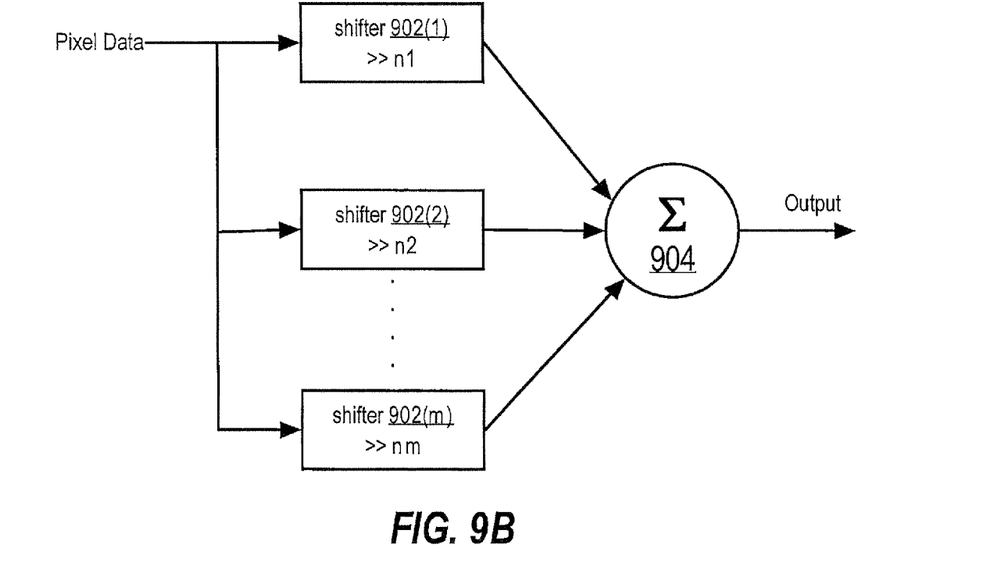
FIG. 9B depicts a system in accordance with an embodiment, which is used to perform the effect of the kernel operations depicted in FIG. 9A.

FIG. 9B depicts a system in accordance with an embodiment, which is used to perform effect of the kernel multiplication operations as depicted in FIG. 9A. The pixel data is input to each shifter 902(1)-902(m). The outputs of the shifters 902 are summed by the adder 904 to generate the final result. Note that the pixel data that is input to each shifter may represent intensity data for a single pixel or, as described above, represent previously summed pixel intensity data corresponding to a coefficient group.

The shifters 902 can be implemented without any gate level resources. In one embodiment, the shifters 902 are implemented by shifting the pixel data bits one or more places by a wire shift and padding one or more zeroes to the pixel data. The adder 904 can be implemented with a fraction of the gates as a multiplier. Therefore, the system of FIG. 9B can be implemented with far fewer gate-level resource than the system of FIG. 9A.

The selection of which shifts are performed can be based on the bits of the kernel coefficient. As a non-limiting example, a kernel coefficient of 11 may be represented as the sum of 8+2+1, which is equivalent to $2^3+2^1+2^0$ (i.e., the sum of three different numbers that are powers of 2). Thus, to perform the equivalent operation of multiplying by 11, the input pixel data is separately left-shifted a total of three bits, one bit, and zero bits, with the sum of all three shifts yielding the output. In one embodiment, the pixel data is input to a multiplexer having an output to each shifter 902(1)-902(m), where 1 through m represent sequentially increasing integer values. The bits of the kernel coefficient are used to select which shifter 902 receives the pixel data. In the present example, the shifters 902 representing 3, 1, and 0 bits shifts are used, while shifters 902 representing 2, 4, . . . , m bit shifts are omitted.

In another embodiment, rather then having "m" shifters 902, a single 1-bit shifter (which performs a 1-bit wire shift) is used. Using a counter, the output of this shifter is fed back into the input as many times as needed to perform variable shifting.

While examples in which the shifters 902 do not use gate level resources have been provided, it is not required that the shifters 902 do not use any gate level resources.

Efficiently Performing Successive Difference Operations

The following section describes methods and devices for efficiently performing successive difference operations. The section provides an example in which the successive difference operations are successive kernel update delta operations performed on a signal. For example, the signal may be a matrix of pixel data, wherein the center pixel is updated. The successive operations, in one embodiment, have the general format depicted in Equations 1-3:

$$A_1=\alpha_0 A_0+(1-\alpha_0)C \qquad \text{Eq. 1}$$

$$A_2=\alpha_1 A_1+(1-\alpha_1)C \qquad \text{Eq. 2}$$

$$\ldots$$

$$A_n=\alpha_{n-1}A_{n-1}+(1-\alpha_{n-1})C \qquad \text{Eq. 3}$$

In equations 1-3, "A" is a kernel matrix that is to be applied to the signal (e.g., represented as a signal matrix), $\alpha_0$-$\alpha_{n-1}$ are parameters, and "C" is a kronecker delta matrix. As used herein, a kronecker delta matrix may be defined as a matrix consisting of zeros at all positions except for a position of interest, which consists of a one. The position of interest may be the center of a matrix or other position as desired. As used herein, the term "matrix" includes any n by m matrix, wherein "n" and "m" are any integers. Thus, the term matrix includes a vector. As the equations show, the kernel matrix is updated by each successive difference equation. $A_0$ is the initial kernel matrix and $A_n$ is a final matrix. The desired processing is that of applying the final matrix $A_n$ to the signal matrix. The parameter in each equation may be different from each other. As an example, the parameter in one equation may be a suitable value to reduce noise in the signal, whereas the parameter in another equation may be a suitable value to compensate for lens shading properties. Moreover, each time a new pixel is processed, the parameters may change. For example, if the parameter is based on an amount of noise in the signal, the amount of noise could be different in a different region of the signal. Overall, the application of the final kernel $A_n$ to the signal matrix improves image contrast, in an embodiment.

Figure 10:
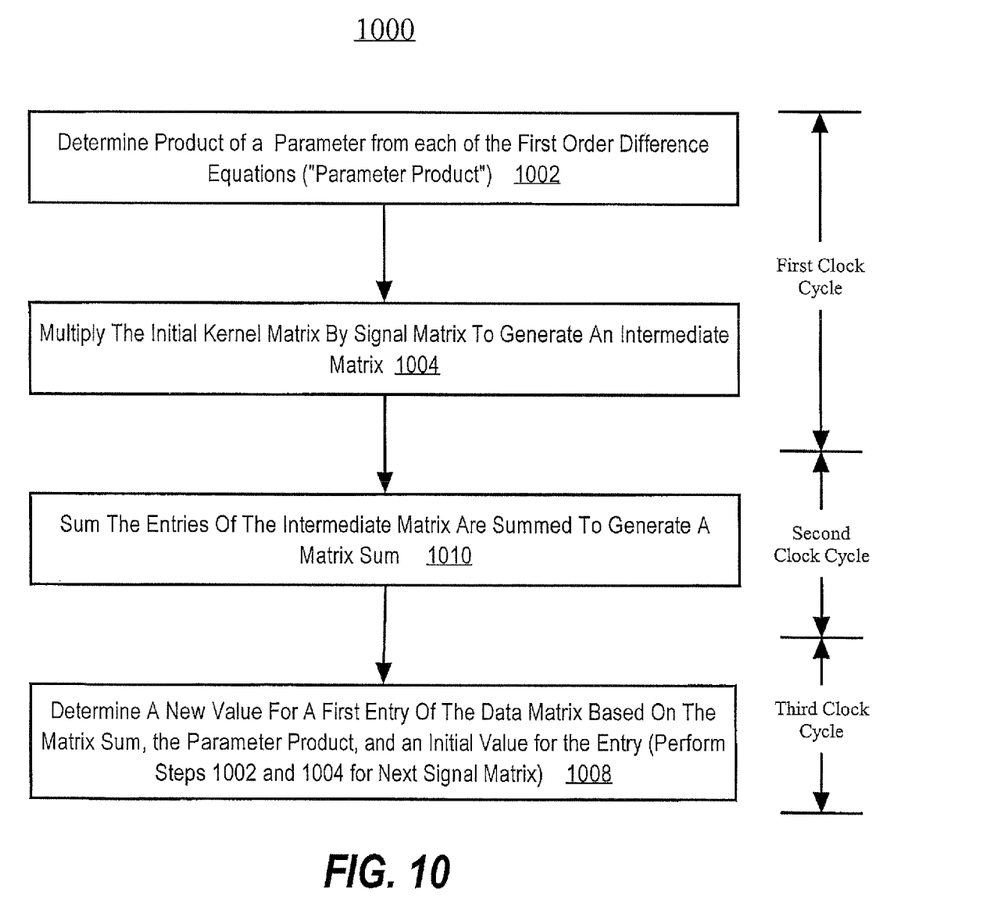
FIG. 10 is a flowchart illustrating steps of a process of updating a first entry in a signal matrix, I, based on a kernel matrix and a succession of first order difference equations, in accordance with an embodiment.

Process Flow for Performing Successive First Order Difference Equations in Accordance with an Embodiment FIG. 10 is a flowchart illustrating steps of a process 1000 of updating a first entry in a signal matrix, I, based on a kernel matrix and a succession of first order difference equations, in accordance with an embodiment. The first order difference equations (Eq. 1-3 above) will be used to help illustrate process 1000. However, process 1000 is not limited to those particular difference equations. In step 1002, a parameter from each of the first order difference equations is multiplied together to generate a "parameter product". For example, the alphas are multiplied together to form the parameter product.

In step 1004, the initial kernel matrix is multiplied by the signal matrix, I, to generate an intermediate matrix, M. Steps 1002 and 1004 are both performed during a first clock cycle, in an embodiment. Steps 1002 and 1004 can be implemented using n+1 multipliers.

In step 1006, the entries of the intermediate matrix are summed to generate a matrix sum. The summing is performed during a second clock cycle, in an embodiment. The summing can be implemented using only a single adder.

In step 1008, a value that is used to update the first entry of the signal matrix is determined. The value is based on the matrix sum, the parameter product, and the initial value for the first entry. The new value is determined during a third clock cycle, in an embodiment. Moreover, during the third clock cycle, processing of the next signal matrix begins by performing steps 1002 and 1004 using the next signal matrix and, possibly, new difference equations. The parameters in the difference equations are allowed to change for each new signal matrix. As an example, one of the parameters might be based on an amount of noise in the signal, in which case the noise can change from one signal matrix to the next. As another example, one of the parameters might be based on a lens shading profile of the lens used to capture the data represented in the signal matrix. During the third clock cycle, the same hardware that was used during the first clock cycle is re-used for processing the second pixel, in an embodiment. Thus, the same hardware that was used for processing a first pixel is re-used to process a second pixel prior to completion of processing the first pixel, in an embodiment.

Updating the first entry in the foregoing manner achieves the same effect as updating the initial kernel matrix with the succession of first order difference equations and then applying the updated kernel matrix to the signal matrix to update the first entry.

In some embodiments, each of the first order difference equations computes an update to a kernel matrix. However, more generally the successive operations may be any first order difference equation. Examples of the first order difference equations include, but are not limited to, first order filtering operations, infinite impulse response (IIR) filters, and averagers. As an example, the operations could be part of a multi-stage "smudging" algorithm which blurs an image given some parameters. As another example, the operations could be a weighted multiple stage moving average.

Furthermore, the signal matrix is not limited to containing pixel data. For example, the signal matrix represents audio data, in an embodiment. As a particular example, the operations are a weighted audio high-pass filter. In this example, the signal matrix is a vector of audio data sampled over time.

Example

For purposes of illustration the following example is provided. In the following, K is an n×n kernel matrix, I is a matrix containing image data, C is a kronecker delta matrix (contains all zeroes except for a one at the center). Alpha and beta are two parameters used to modify the kernel matrix. As an example, alpha could be used to modify the kernel based on the amount of noise in the image data, and beta could be used to modify the kernel based on a shading profile of the lens used to capture the image data. However, alpha and beta could be any parameters.

A) Net Effect of Processing

The following describes the net effect of processing the image signal with the kernel matrix that is modified by alpha and beta. However, the following operations do not actually need to be performed. Instead other operations are performed in accordance with an embodiment, which saves hardware and clock cycles. First, the kernel could be modified based on the value of alpha to generate an intermediate kernel, $K_{int}$.

$$K_{int} = \alpha K + (1-\alpha)C \qquad \text{Eq. 4}$$

Then, the intermediate kernel could be modified based on beta to generate a final kernel, $K_{final}$.

$$K_{final} = \beta K_{int} + (1-\beta)C \qquad \text{Eq. 5}$$

Then, the final kernel could be piecewise multiplied by the image matrix, I, to generate a modified image matrix M.

$$M = I \cdot K_{final} \qquad \text{Eq. 6}$$

Finally, the pixel values in the modified image matrix, M, could be summed to generate a new value for the center pixel in the image matrix, I. This would conclude processing for a single pixel.

$$i_{new} = \sum_{\substack{i=1 \\ j=1}}^{n} m_{ij} \qquad \text{Eq. 7}$$

If K is an n×n matrix, then the above could potentially be performed with n+1 products for Equations 4 and 5, and n products for Equation 6. Therefore, for real time implementation, this would require more than 3n parallel multipliers to implement. Alternatively, this could be performed with a tripling of clock frequency and re-using hardware. However, such a high frequency may be impractical or impossible to achieve.

Figure 11:
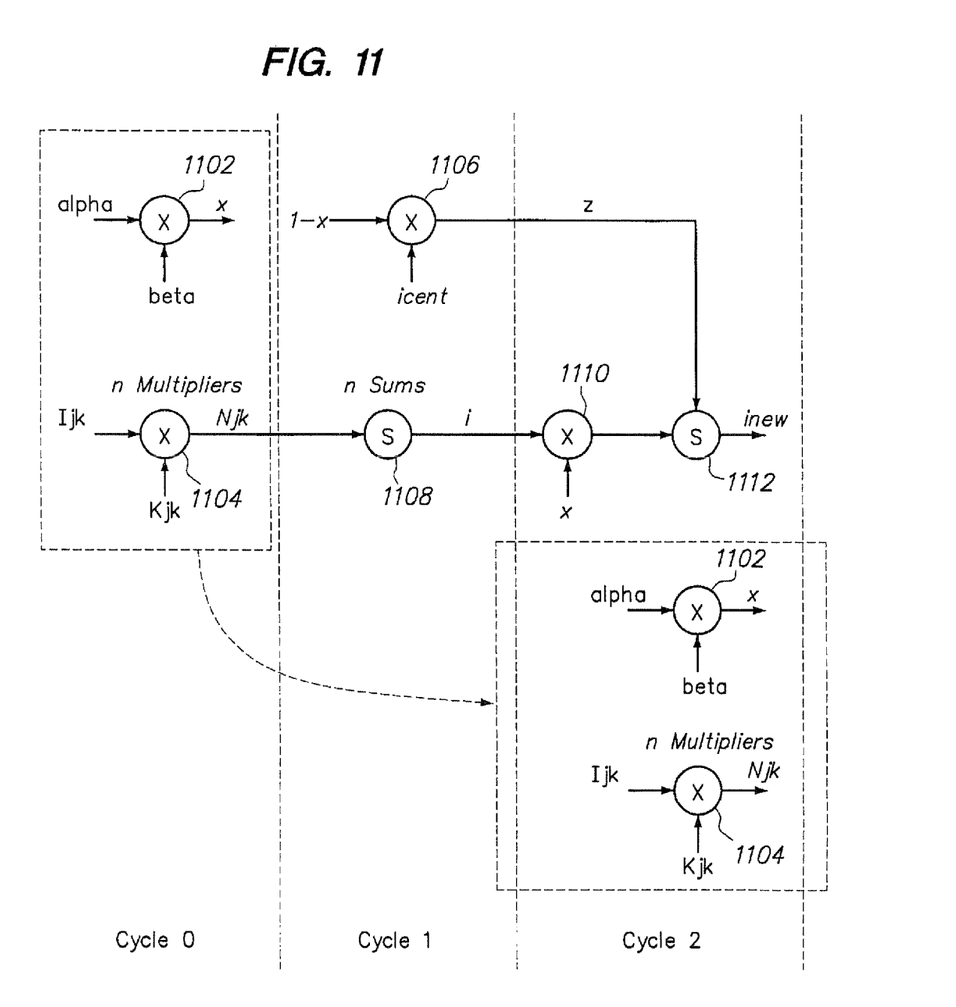
FIG. 11 depicts hardware for performing kernel computations in accordance with an embodiment.

The following technique is used to implement the logical steps above, but with far less hardware, in accordance with an embodiment. Furthermore, no increase in clock frequency is required. FIG. 11 depicts hardware for performing kernel computations in accordance with an embodiment.

During clock cycle 0, one multiplier 1102 is used to compute the product, "x", of alpha and beta. Furthermore, N multipliers 1104 are used to piecewise multiply the entries of the initial kernel matrix, $K_{jk}$, by the entries of the signal matrix, $I_{jk}$, to generate entries of an intermediate matrix "$N_{jk}$".

During the second clock cycle, the entries of the intermediate matrix, $N_{jk}$, are summed by the adder 1108 to generate a matrix sum "i". The summation of the entries produces:

$$i = \sum_{\substack{i=1 \\ j=1}}^{n} n_{ij} \qquad \text{Eq. 8}$$

Also during clock cycle 1, the initial value of the pixel "icent" is multiplied by the value "1−x" by multiplier 1106, which output intermediate product "z". This intermediate product is input to adder 1112.

During clock cycle 2, a new value, "inew", is determined for the first entry, based on the matrix sum (i), the product (x) and initial value the intermediate product "z". Based on clock cycles 1 and 2, the new pixel value, $i_{new}$, for the center pixel may be calculated as:

$$i_{new} = xi + (1-x)i_{cent} \qquad \text{Eq. 9}$$

In general, the hardware depicts in FIG. 11 comprises n+3 multipliers and n adders. A first stage includes "n+1" multipliers 1102, 1104, wherein the first stage is operable to multiply a parameter (e.g., alpha, beta) from each of the first order difference equations to generate a parameter product ("x"), and multiply the kernel matrix (K) by the signal matrix (I) to generate "n" entry products ($N_{jk}$). A second stage is coupled to the first stage and including an adder 1108, wherein the first stage is operable to sum the "n" entry products to generate a matrix sum (i). A third stage is coupled to the second stage and includes an adder 1112. The third stage is operable to determine a new value ($i_{new}$) for the signal, based on the matrix sum, the parameter product, and the initial value for the signal. Note that initial value of the signal is processed by the second stage to produce "z", which is input to the adder 1112 of the third stage.

Hardware Overview

Example Mobile Device

Figure 13:
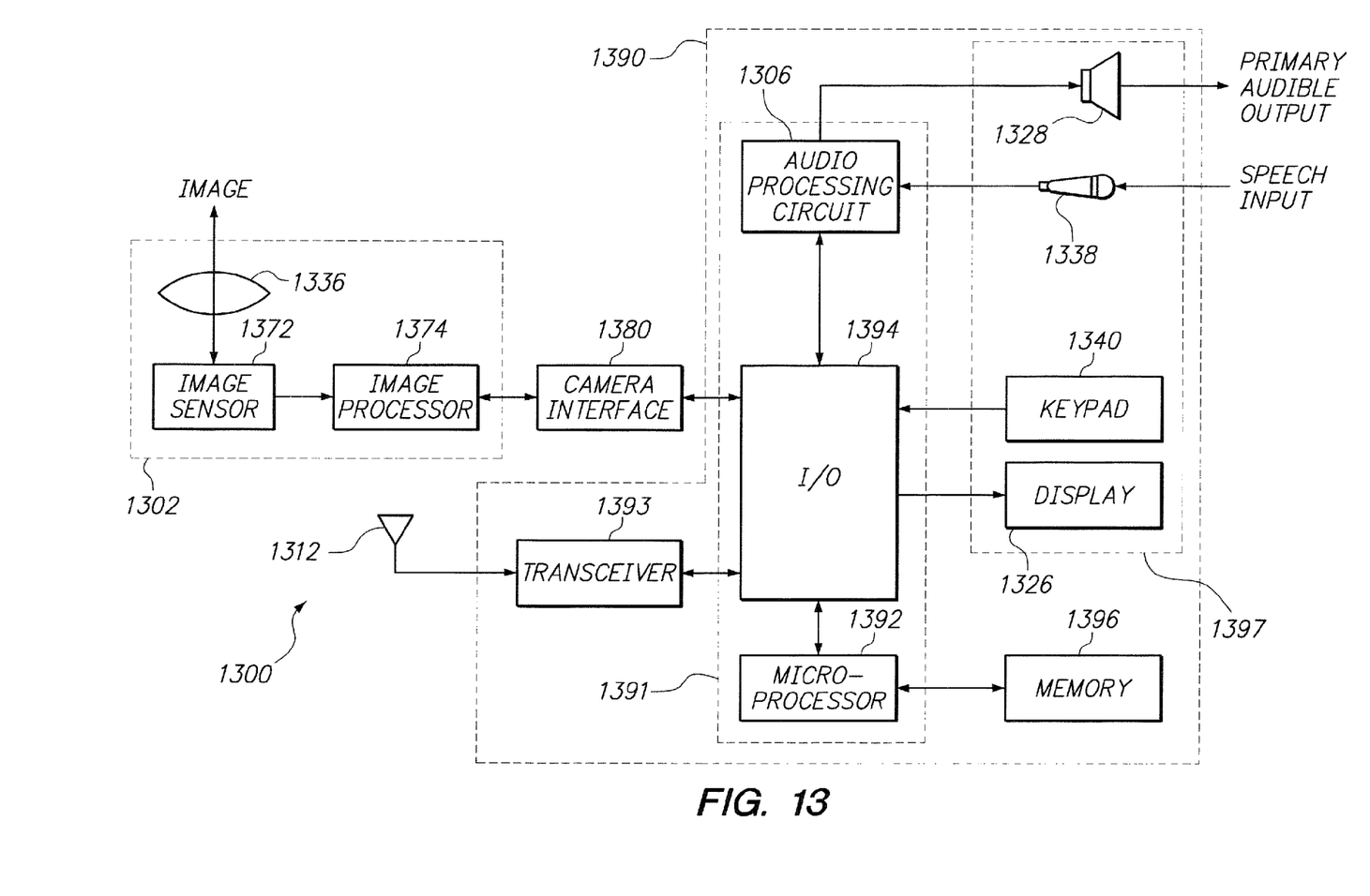
FIG. 13 illustrates a block diagram for an example mobile device in which embodiments of the present invention may be implemented.

FIG. 13 illustrates a block diagram for an example mobile device 1300 in which embodiments of the present invention may be implemented. Mobile device 1300 comprises a camera assembly 1302, camera and graphics interface 1380, and a communication circuit 1390. Camera assembly 1372 includes camera lens 1336, image sensor 1372, and image processor 1374. Camera lens 1336, comprising a single lens or a plurality of lenses, collects and focuses light onto image sensor 1372. Image sensor 1372 captures images formed by light collected and focused by camera lens 1336. Image sensor 1372 may be any conventional image sensor 1372, such as a charge-coupled device (CCD) or a complementary metal oxide semiconductor (CMOS) image sensor. Image processor 1374 processes raw image data captured by image sensor 1372 for subsequent storage in memory 1396, output to a display 1326, and/or for transmission by communication circuit 1390. The image processor 1374 may be a conventional digital signal processor programmed to process image data, which is well known in the art.

Image processor 1374 interfaces with communication circuit 1390 via camera and graphics interface 1380. Communication circuit 1390 comprises antenna 1312, transceiver 1393, memory 1396, microprocessor 1392, input/output circuit 1394, audio processing circuit 1306, and user interface 1397. Transceiver 1393 is coupled to antenna 1312 for receiving and transmitting signals. Transceiver 1393 is a fully functional cellular radio transceiver, which may operate according to any known standard, including the standards known generally as the Global System for Mobile Communications (GSM), TIA/EIA-136, cdmaOne, cdma2000, UMTS, and Wideband CDMA.

The image processor 1374 may process images acquired by the sensor 1372 using one or more embodiments described herein. The image processor 1374 can be implemented in hardware, software, or some combination of software and hardware. For example, the image processor 1374 could be implemented as part of an application specific integrated circuit (ASIC). As another example, the image processor 1374 may be capable of accessing instructions that are stored on a computer readable medium and executing those instructions on a processor, in order to implement one or more embodiments of the present invention.

Microprocessor 1392 controls the operation of mobile device 1300, including transceiver 1393, according to programs stored in memory 1396. Microprocessor 1392 may further execute portions or the entirety of the image processing embodiments disclosed herein. Processing functions may be implemented in a single microprocessor, or in multiple microprocessors. Suitable microprocessors may include, for example, both general purpose and special purpose microprocessors and digital signal processors. Memory 1396 represents the entire hierarchy of memory in a mobile communication device, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 1392.

Input/output circuit 1394 interfaces microprocessor 1392 with image processor 1374 of camera assembly 1372 via camera and graphics interface 1380. Camera and graphics interface 1380 may also interface image processor 1374 with user interface 1397 according to any method known in the art. In addition, input/output circuit 1394 interfaces microprocessor 1392, transceiver 1393, audio processing circuit 1306, and user interface 1397 of communication circuit 1390. User interface 1397 includes a display 1326, speaker 1328, microphone 1338, and keypad 1340. Display 1326, disposed on the back of display section, allows the operator to see dialed digits, images, called status, menu options, and other service information. Keypad 1340 includes an alphanumeric keypad and may optionally include a navigation control, such as joystick control (not shown) as is well known in the art. Further, keypad 1340 may comprise a full QWERTY keyboard, such as those used with palmtop computers or smart phones. Keypad 1340 allows the operator to dial numbers, enter commands, and select options.

Microphone 1338 converts the user's speech into electrical audio signals. Audio processing circuit 1306 accepts the analog audio inputs from microphone 1338, processes these signals, and provides the processed signals to transceiver 1393 via input/output 1394. Audio signals received by transceiver 1393 are processed by audio processing circuit 1306. The basic analog output signals produced by processed audio processing circuit 1306 are provided to speaker 1328. Speaker 1328 then converts the analog audio signals into audible signals that can be heard by the user.

Those skilled in the art will appreciate that one or more elements shown in FIG. 13 may be combined. For example, while the camera and graphics interface 1380 is shown as a separated component in FIG. 13, it will be understood that camera and graphics interface 1380 may be incorporated with input/output circuit 1394. Further, microprocessor 1392, input/output circuit 1394, audio processing circuit 1306, image processor 1374, and/or memory 1396 may be incorporated into a specially designed application-specific integrated circuit (ASIC) 1391.

Example Computer System

Figure 12:
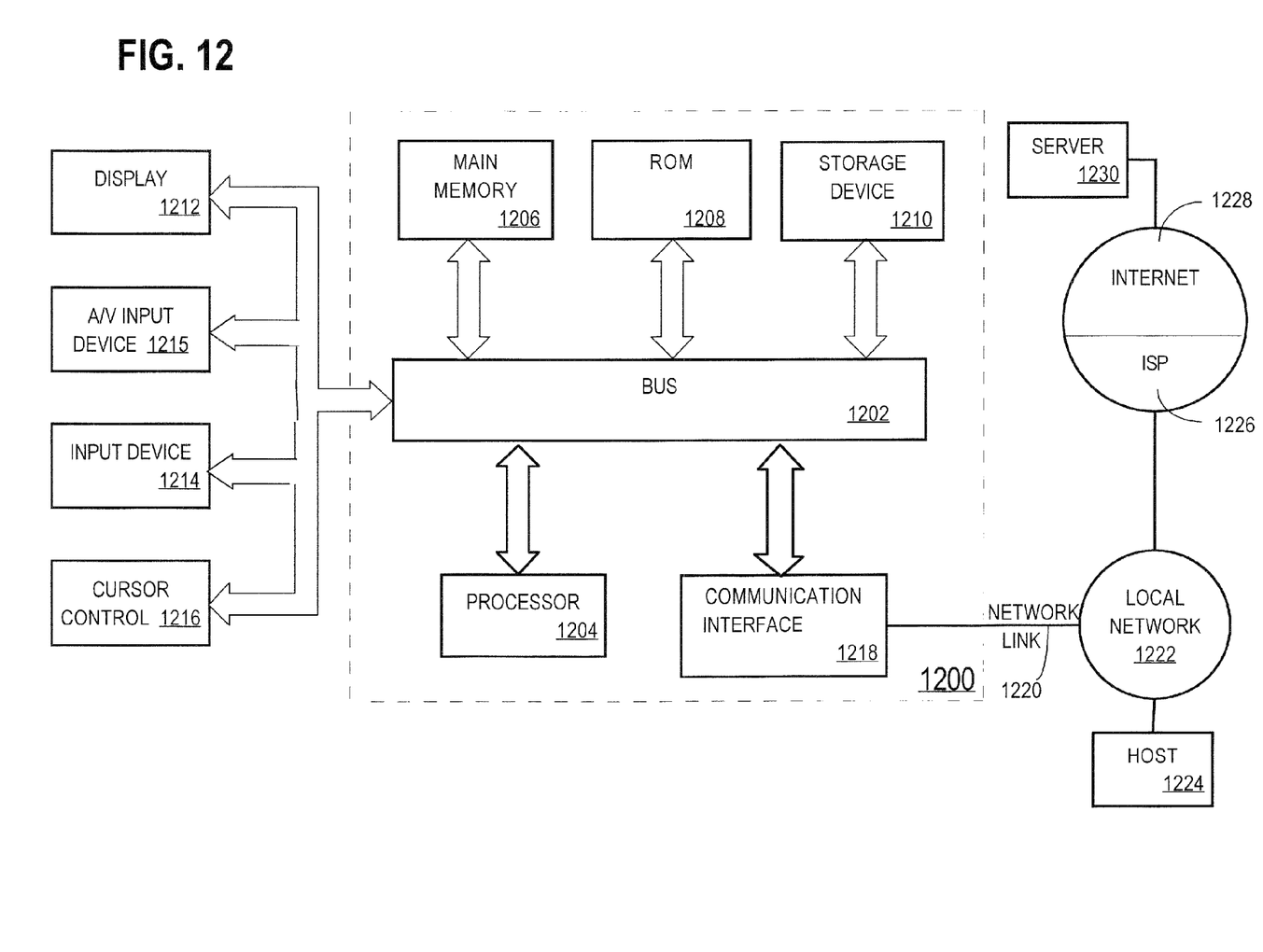
FIG. 12 is a block diagram that illustrates a computer system upon which an embodiment of the invention may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. The computer system 1200 may further include an audio/video input device 1215 such as a microphone or camera to supply audible sounds, still images, or motion video, any of which may be processed using the embodiments described above.

Various processing techniques disclosed herein may be implemented to process data on a computer system 1200. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1200, various machine-readable media are involved, for example, in providing instructions to processor 1204 for execution. Such a medium may take many forms, including but not limited to storage media and transmission media. Storage media includes both non-volatile media and volatile media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. In this manner, computer system 1200 may obtain application code in the form of a carrier wave.

Data that is processed by the embodiments of program code as described herein may be obtained from a variety of sources, including but not limited to an A/V input device 1215, storage device 1210, and communication interface 1218.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An image processing method comprising:
accessing a coefficient for each of a plurality of coefficient groups in a kernel matrix, wherein kernel coefficients that have a common value form members of a given one of said coefficient groups, wherein each kernel coefficient has a corresponding entry in a data matrix that comprises pixel values, and wherein at least one of said coefficient groups includes at least two kernel coefficient members;
for each coefficient group, summing the value of each entry in the data matrix that corresponds to kernel coefficients in the coefficient group to generate a summed value for each coefficient group;
for each coefficient group, multiplying the summed value by the coefficient of the coefficient group to determine a final value for each coefficient group, wherein a particular coefficient group of the plurality of coefficient groups has a particular summed value and a particular coefficient, wherein the particular coefficient is a sum of at least a first term and a second term where the first term has a value of $2^n$, where n is an integer, and the second term has a value of $2^m$, where m is a different integer than n, and wherein multiplying the particular summed value by the particular coefficient comprises:
bit shifting the particular summed value by n bits to derive a first intermediate value;
bit shifting the particular summed value by m bits to derive a second intermediate value; and
deriving a final value for the particular coefficient group based at least in part on the first and second intermediate values; and
determining a new pixel value for a particular entry of the data matrix based at least in part on the final value for each coefficient group;
wherein the method is performed by one or more image processing devices comprising a storage circuit.

2. The method of claim 1, wherein the coefficients of the kernel have a symmetric distribution.

3. The method of claim 1, wherein the coefficients of the kernel have a radially symmetric distribution.

4. The method of claim 1, wherein the value of each kernel coefficient is a sum of a power of two.

5. The method of claim 1, wherein the kernel matrix comprises kernel coefficients that are symmetrically distributed such that coefficients that are substantially equidistant from a central point of the kernel matrix share a common value.

6. The method of claim 1, wherein each entry in the data matrix represents a pixel value.

7. The method of claim 1, further comprising:
forming the kernel matrix such that the kernel coefficients are symmetrically distributed.

8. The method of claim 7, wherein kernel coefficients that are substantially equidistant from a region of the kernel matrix share a common value.

9. The method of claim 8, wherein the region is a line.

10. The method of claim 8, wherein the region is a point.

11. An image processing method for updating an entry in a signal matrix, wherein the entry represents a pixel value, and wherein the entry is updated based at least in part on a first matrix and a succession of first order difference equations having the format:
$A_n = \alpha_{n-1} A_{n-1} + (1-\alpha_{n-1}) C$, wherein A is a first matrix, $\alpha$ is a parameter, n is an integer, and C is a second matrix, said method comprising:
multiplying the parameter from each of the first order difference equations to generate a product;
multiplying the first matrix by the signal matrix to generate an intermediate matrix;
summing entries of the intermediate matrix to generate a matrix sum; and
determining a new value for the entry in the signal matrix, based at least in part on the matrix sum, the product, and an initial value for the entry in the signal matrix;
wherein the method is performed by one or more image processing devices comprising age circuit.

12. The method of claim 11, wherein multiplying the first matrix by the signal matrix is performed during a first clock cycle.

13. The method of claim 12, wherein multiplying the parameter from each of the first order difference equations is performed during the first clock cycle.

14. The method of claim 13, wherein summing entries of the intermediate matrix is performed during a second clock cycle.

15. The method of claim 14, wherein the product is a first product, wherein the method further comprises, during the second clock cycle, determining a second product based at least in part on the initial value for the entry in the signal matrix and the first product, and wherein the new value for the entry in the signal matrix is determined based at least in part on the matrix sum, the first product, and the second product.

16. The method of claim 14, wherein the signal matrix is a first signal matrix, the first order difference equations are a first set of difference equations, the product is a first product, and the intermediate matrix is a first intermediate matrix, and wherein the method further comprises, during a third clock cycle, beginning to update an entry in a second signal matrix by performing the following:
multiplying the parameter from each equation of a second set of first order difference equations to generate a second product; and multiplying the first matrix by the second signal matrix to generate a second intermediate matrix.

17. The method of claim 16, wherein the method provides a new entry in a signal matrix every two clock cycles.

18. The method of claim 16, wherein the first product and the first intermediate matrix are generated during the first clock cycle using a set of hardware, and wherein the operation of beginning to update the entry in the second signal matrix, performed during the third clock cycle, is performed using the same set of hardware.

19. The method of claim 11, wherein updating the entry achieves updating the first matrix with the succession of first order difference equations and then applying the updated first matrix to the signal matrix to update the entry.

20. The method of claim 11, wherein the second matrix is a delta matrix.

21. The method of claim 11, wherein the first matrix is a kernel matrix.

22. The method of claim 11, wherein the first matrix is a vector.

23. An apparatus for updating an entry in a signal matrix based at least in part on a kernel matrix and a succession of first order difference equations, wherein the kernel matrix has "n" entries, said apparatus comprising:
a first stage including "n+1" multipliers, wherein the first stage is operable to:
multiply a parameter from each of the first order difference equations to generate a parameter product; and
multiply the kernel matrix by the signal matrix to generate "n" entry products;
a second stage coupled to the first stage and including an adder, wherein the second stage is operable to sum the "n" entry products to generate a matrix sum; and
a third stage coupled to the second stage and including an adder, wherein the third stage is operable to determine a value for updating the entry in the signal matrix, based at least in part on the matrix sum, the parameter product, and an initial value for the entry in the signal matrix.

24. The apparatus of claim 23 wherein:
the second stage further comprises a multiplier that is operable to generate a first intermediate product based at least in part on the initial value and the parameter product; and
the third stage further comprises a multiplier that is operable to generate a second intermediate product based at least in part on the parameter product and the matrix sum;
wherein the value for updating the entry in the signal matrix is generated by the adder, included in the third stage, based at least in part on the first intermediate product and the second intermediate product.

25. An image processing method for processing a signal based at least in part on a succession of first order difference equations having the format:

$$A_n = \alpha_{n-1} A_{n-1} + (1 - \alpha_{n-1}),$$

wherein $A_n$ is a function that is updated by each first order difference equation, and $\alpha$ is a parameter, and n is an integer, said method comprising:
multiplying the parameter from each of the first order difference equations to generate a product;
applying an initial function, $A_{n-1}$, to the signal to generate an intermediate signal; and
applying the product to the intermediate signal to generate a final signal;
wherein the method is performed by one or more image processing devices comprising a storage circuit.

26. The method of claim 25, wherein multiplying the parameter from each of the first order difference equations to generate the product and applying the initial function, $A_{n-1}$, to the signal to generate the intermediate signal are performed during the same a single clock cycle.

27. A device comprising:
a storage circuit;
logic that is operable to:
access a coefficient for each of a plurality of coefficient groups in a kernel matrix, wherein kernel coefficients that have a common value form members of a given one of said coefficient groups, wherein each kernel coefficient has a corresponding entry in a data matrix that comprises pixel values, and wherein at least one of said coefficient groups includes at least two kernel coefficient members;
for each coefficient group, sum the value of each entry in the data matrix that corresponds to kernel coefficients in the coefficient group to generate a summed value for each coefficient group;
for each coefficient group, multiply the summed value by the coefficient of the coefficient group to determine a final value for each coefficient group, wherein a particular coefficient group of the plurality of coefficient groups has a particular summed value and a particular coefficient, wherein the particular coefficient is a sum of at least a first term and a second term where the first term has a value of $2^n$, where n is an integer, and the second term has a value of $2^m$, where m is a different integer than n, and wherein multiplying the particular summed value by the particular coefficient comprises:
bit shifting the particular summed value by n bits to derive a first intermediate value;
bit shifting the particular summed value by m bits to derive a second intermediate value; and
deriving a final value for the particular coefficient group based at least in part on the first and second intermediate values; and
determine a new pixel value for a particular entry of the data matrix based at least in part on the final value for each coefficient group.

28. A device comprising:
a storage circuit;
logic that is operable to update an entry in a signal matrix based at least in part on a first matrix and a succession of first order difference equations having the format:
$A_n = \alpha_{n-1} A_{n-1} + (1 - \alpha_{n-1}) C$, wherein A is a first matrix, $\alpha$ is a parameter, n is an integer, and C is a second matrix, wherein said logic is configured to:
multiply the parameter from each of the first order difference equations to generate a product;
multiply the first matrix by the signal matrix to generate an intermediate matrix;
sum entries of the intermediate matrix to generate a matrix sum; and
determine a new value for the entry in the signal matrix, based at least in part on the matrix sum, the product, and an initial value for the entry in the signal matrix.

* * * * *